United States Patent
Cape et al.

(10) Patent No.: US 11,938,748 B2
(45) Date of Patent: Mar. 26, 2024

(54) MICRO-OPTIC SECURITY DEVICE WITH INTERACTIVE DYNAMIC SECURITY FEATURES

(71) Applicant: VISUAL PHYSICS, LLC, Alpharetta, GA (US)

(72) Inventors: Samuel M. Cape, Woodstock, GA (US); Benjamin E. Bleiman, Cumming, GA (US); Jonathan D. Gosnell, Cumming, GA (US)

(73) Assignee: Visual Physics, LLC, Alpharetta, GA (US)

( * ) Notice: Subject to any disclaimer, the term of this patent is extended or adjusted under 35 U.S.C. 154(b) by 0 days.

(21) Appl. No.: 17/654,765

(22) Filed: Mar. 14, 2022

(65) Prior Publication Data
US 2022/0194115 A1 Jun. 23, 2022

Related U.S. Application Data

(63) Continuation of application No. 15/733,341, filed as application No. PCT/US2019/012212 on Jan. 3, 2019, now Pat. No. 11,273,661.
(Continued)

(51) Int. Cl.
*B42D 25/45* (2014.01)
*B42D 25/324* (2014.01)
(Continued)

(52) U.S. Cl.
CPC ......... *B42D 25/324* (2014.10); *B42D 25/328* (2014.10); *B42D 25/342* (2014.10); *B42D 25/45* (2014.10); *G03H 1/28* (2013.01)

(58) Field of Classification Search
CPC .. B42D 25/324; B42D 25/328; B42D 25/342; B42D 25/45; B42D 25/351; G03H 1/28; G03H 2223/19
(Continued)

(56) References Cited

U.S. PATENT DOCUMENTS

2007/0273143 A1* 11/2007 Crane ................... B42D 25/00
                                                         283/72
2009/0034082 A1 2/2009 Commander et al.
(Continued)

FOREIGN PATENT DOCUMENTS

CN      101443692 A     5/2009
CN      101563640 A    10/2009
(Continued)

OTHER PUBLICATIONS

European Search Report dated Mar. 14, 2023, in connection with European Application No. 22177050.6, 11 pages.
(Continued)

*Primary Examiner* — Justin V Lewis

(57) ABSTRACT

A security device includes an image projection system that includes an array of focusing elements (101) and an array of image icon elements (103) disposed relative to each other such that a synthetic image is projected by the image projection system. This synthetic image, along with at least one other image functions as a targeting image. As targeting images (310', 310"), these images are spatially coordinated such that a reward image (350), which is otherwise at least partially hidden, becomes revealed upon the targeting images having a predetermined transformation. This targeting effect functions as a game that attracts the attention of an end-user of high-valued articles of manufacture to which the security device is attached. The security device allows a viewer to actively interact with the security device by trying to turn on the reward image.

18 Claims, 4 Drawing Sheets

Related U.S. Application Data

(60) Provisional application No. 62/613,090, filed on Jan. 3, 2018.

(51) Int. Cl.
    *B42D 25/328*     (2014.01)
    *B42D 25/342*     (2014.01)
    *G03H 1/28*     (2006.01)

(58) Field of Classification Search
    USPC ........................ 283/72, 94, 98, 109, 110, 901
    See application file for complete search history.

(56) References Cited

U.S. PATENT DOCUMENTS

| | | |
|---|---|---|
| 2009/0122412 A1 | 5/2009 | Steenblik et al. |
| 2010/0194094 A1 | 8/2010 | Kiuchi et al. |
| 2013/0056971 A1 | 3/2013 | Holmes |
| 2016/0121640 A1 | 5/2016 | Raymond |
| 2016/0176221 A1 | 6/2016 | Holmes |

FOREIGN PATENT DOCUMENTS

| | | | |
|---|---|---|---|
| CN | 111247004 | A | 6/2020 |
| GB | 2549724 | A | 11/2017 |
| JP | 2009536885 | A | 10/2009 |
| JP | 2016539378 | A | 12/2016 |
| KR | 10-2008-0023302 | A | 3/2008 |
| KR | 10-2009-0028523 | A | 3/2009 |
| WO | 2005106601 | A2 | 11/2005 |

OTHER PUBLICATIONS

Notice of acceptance for patent application dated Feb. 22, 2023, in connection with Australian Application No. 2019205265, 3 pages.
Notice of Reasons for Refusal dated Jan. 10, 2023, in connection with Japanese Application No. 2020-537188, 10 pages.
Notification on results of patentability check of invention dated Feb. 17, 2022, in connection with Russian Application No. 2020125412/28(044170), 18 pages.
The Second Office Action dated Mar. 30, 2022, in connection with Chinese Application No. 201980007269.3, 8 pages.
Examination report dated Oct. 11, 2022, in connection with Australian Application No. 2019205265, 3 pages.
Decision to Grant dated Oct. 5, 2022, in connection with Russian Application No. 2020125412/28(044170), 16 pages.
Notification to Grant Patent Right for Invention dated Jun. 28, 2022, in connection with Chinese Application No. 201980007269.3, 6 pages.
Examination report dated Jun. 30, 2022, in connection with Indian Application No. 202027020723, 11 pages.
Communication pursuant to Article 94(3) EPC dated Sep. 8, 2022, in connection with European Application No. 19736052.2, 5 pages.
International Search Report and Written Opinion of the International Searching Authority in connection with International Application No. PCT/US2019/012212 dated Mar. 8, 2019, 9 pages.
Communication pursuant to Rules 70(2) and 70a(2) EPC dated Sep. 21, 2021, in connection with European Application No. 19736052.2, 1 page.
Supplementary European Search Report dated Sep. 1, 2021, in connection with European Application No. 19736052.2, 10 pages.
The First Office Action dated Aug. 31, 2021, in connection with Chinese Application No. 201980007269.3, 20 pages.
First Substantive Examination Report dated Jul. 11, 2023, in connection with Mexican Application No. MX/a/2020/006970, 6 pages.
Notice of Opinion dated Sep. 18, 2023, in connection with Korean Application No. 10-2020-7019277, 18 pages.
Communication pursuant to Article 94(3) EPC dated Jul. 4, 2023, in connection with European Application No. 19736052.2, 5 pages.
Notice of allowance dated Oct. 9, 2023, in connection with Mexican Application No. MX/a/2020/006970, 4 pages.

\* cited by examiner

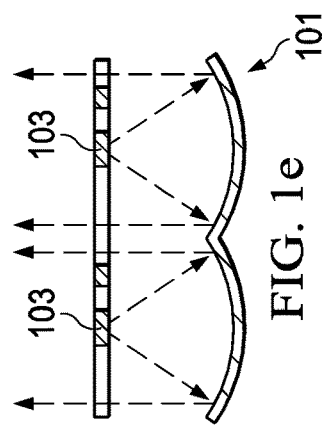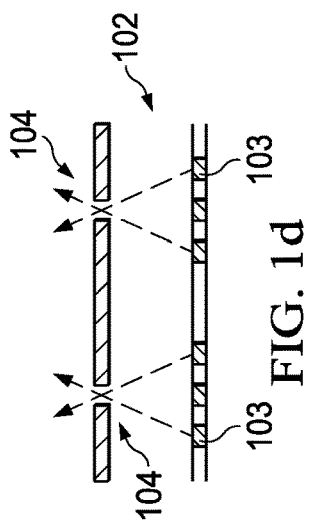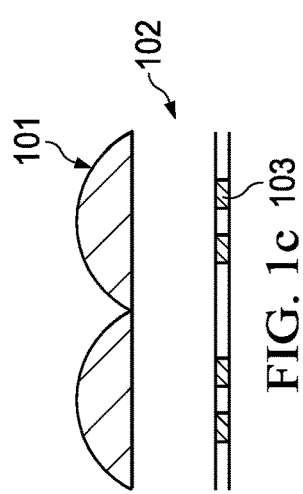

MICRO-OPTIC SECURITY DEVICE WITH INTERACTIVE DYNAMIC SECURITY FEATURES

CROSS-REFERENCE TO RELATED APPLICATIONS

This application is a continuation of application Ser. No. 15/733,341, filed Jul. 1, 2020, which is the National Stage of International Application No. PCT/US2019/012212, filed Jan. 3, 2019, which claims priority to U.S. Provisional Patent Application No. 62/613,090, filed Jan. 3, 2018, the disclosures of which are incorporated herein by reference.

TECHNICAL FIELD

Embodiments according to the present disclosure generally relate to a security device suitable for use in providing enhanced security to high value articles of manufacture by imparting at least one of an aestheticizing, or authenticating effect to said high value articles of manufacture when affixed thereto. In certain embodiments, an optical security device comprises an arrangement of micro-image elements disposed relative to an arrangement of focusing elements such that the micro-images, or portions thereof, project one or more synthetic images when the micro-images or portions thereof are viewed through the arrangement of focusing elements or portions thereof. This security device provides at least one dynamic optical effect whereby at least one of the synthetic images projected by the device appears to an observer to transform—in terms of at least one of its shape, location, color or size—as the observer's point of view changes. More specifically, the dynamic optical effect is an interactive dynamic optical effect where the optical effect is accompanied by or includes at least one targeting effect. The targeting effect comprises the interaction of two or more targeting images—at least one of which is one of the synthetic images—that appear to spatially coordinate to reveal at least one reward image. For example, where the dynamic optical effect is transformation of the synthetic image's location, the at least two targeting images spatially interact with each other such that, at predetermined relative locations a reward image is revealed.

Embodiments according to this disclosure include methods of manufacturing the security device, uses of the security device, methods of securing high value articles of manufacture with the security device, methods of manufacturing secured high value articles of manufacture and products made by the processes described herein.

BACKGROUND

There are several kinds of optical security devices. For example, optical security devices are described and shown in U.S. Pat. Nos. 7,333,268; 7,738,175; and 7,468,842 where one or more synthetic images are projected by the security device.

While there are several optical security devices that are suitable for providing enhanced security to various articles of manufacture, these are often "level-1" (e.g., visible to a user's eye) security features that require the end-user to visually examine an integrated security device in order to authenticate the article of manufacture to which it is affixed. However, such devices suffer from the inherent dynamics of how such articles of manufacture are used. For example, while banknotes are often secured (aestheticized, and/or authenticated) by such security devices being affixed thereto, the effectiveness of such security devices depends on the interaction of the end-user with the security device. However, due in large part to the fast pace of use, end-users of banknotes and other such articles of manufacture often are disengaged from the authentication process in that they quite often use the banknotes without authenticating the banknote by engaging the security device.

SUMMARY

Certain embodiments according to this disclosure provide a security device that improves end user interaction and engagement with the security devices used to secure high value articles of manufacture. Such security devices would in turn improve the effectiveness of the security device as a level-1 security device thereby discouraging counterfeiting.

Security devices according to various embodiments of this disclosure provide functionalities which encourage users to engage or interact with the security device. By so doing, an end-user is not only engaged with a synthetic image or a dynamic optical effect, but is also engaged with an interactive dynamic optical effect (i.e., a targeting effect) whereby the end-user's intellect is challenged and is rewarded. More specifically, in some embodiments, the security device includes a game that allows the end-user to transform the optical relationship of targeting images to produce/reveal a reward image. For example, an end-user will be rewarded with a reward image when she is able to successfully force targeting images to spatially fully overlap, occupy predetermined non-overlapping locations, or overlap partially. Through this engagement, the authenticating or aestheticizing features of the security device are more frequently utilized through the increased engagement of end-users with the security device. By providing, in certain embodiments, a "game like" functionality in the security features of a security device, end users may be more likely to take careful note of the presence and functionality of the security device, and by implication, more frequently spot counterfeits.

In one aspect of the present disclosure, an optical security device is provided. In certain embodiments, the optical security device is a micro-optic security device comprising an image projection system including (i) an array of focusing elements; (ii) an array of image icon elements disposed proximate to the array of focusing elements such that at least one synthetic image is projected by the image projection system when at least portions of the array of image icon elements are viewed through at least portions of the array of focusing elements; and (iii) an array of control pattern elements integrated across the array of image icon elements, or a part thereof; a set of targeting images at least one of which is one of the synthetic images projected by the image projection system; and at least one reward image. The micro-optic security device is further characterized in that the security device provides a targeting effect whereby at a predetermined alignment phase the targeting images are spatially coordinated to coincide with the revelation of a reward image.

In various embodiments, the micro-optic security device is further characterized in that the visibility of the targeting images and reward image(s) is modulated by an array of control pattern elements.

In some embodiments according to this disclosure, a method of producing the micro-optic security device is provided. In a particular embodiment, the micro-optic security device is produced by providing an image projection system having an array of image icon elements integrated with an array of control pattern elements and layered with an array of focusing elements such that at least one synthetic image is projected by the image projection system when at least portions of the array of image icon elements are viewed through at least portions of the array of focusing elements. The method is further characterized in that the micro-optic security device provides at least two targeting images that are spatially coordinated at a predetermined alignment phase to coincide with the revelation of at least one reward image when in-phased portions of the array of control pattern elements are in focus of the array of focusing elements such that at least one set of reward images is revealed. According to certain embodiments, the predetermined alignment phase is associated with a predetermined viewing angle, or a range of viewing angles. In some embodiments, the predetermined alignment phase exists due to the interplay between a control elements and image icon elements, but the viewing angle with which the predetermined alignment is associated is not predetermined or otherwise known in advance.

In some embodiments, a method comprises (i) providing an array of focusing elements; (ii) providing an array of image icon elements; and (iii) arranging the array of focusing elements and array of image icon elements, relative to each other, such that a synthetic image is projected by the image icon elements when at least portions of the array of image icon elements are viewed through at least portions of the array of focusing elements. The method is further characterized in that the micro-optic security device provides at least two targeting images that are spatially coordinated at predetermined alignment phases such that the spatial coordination coincides with the revelation of at least one reward image. The method is also further characterized in that the spatial coordination of the targeting images coincide with when the in-phased portions of the array of control pattern elements are in focus of the array of focusing elements. At one or more predetermined alignment phases, in-phased portions of the array of control pattern elements are in focus and at least one reward image is revealed According to various embodiments of this disclosure, the array of image icon elements and the array of focusing elements are arranged, relative to each other, such that the security device provides at least one synthetic image with a dynamic optical effect that forms part of the targeting effect. The targeting effect, as described herein throughout, comprises the spatial interaction of one targeting image—having a dynamic optical effect—with another targeting image, which may be another synthetic image with a dynamic optical effect, a synthetic image with a static optical effect, a natural image, or a selected optical coordinate. The spatial interaction contemplated throughout herein includes where the targeting images are brought to a predetermined distance apart relative to each other such as at a targeting distance apart, partially overlapping, or fully overlapping, preferably at least partially overlapping, at a predetermined alignment phase. At this predetermined alignment phase, the in-phased portions of the array of control pattern elements are in focus of the array of focusing elements, thereby revealing (e.g., turning on) the reward image. Preferably, when the reward image is turned on, the targeting images are turned off and when the reward image is turned off one or more of the targeting images are either turned on or off. However, in some embodiments, only a portion of the targeting image is turned off or only a portion of the reward image is turned on and vice versa. The spatial interaction of the targeting images can be an overlap of the targeting images, or placement of the targeting images at a predefined distance from each other, or a change in the size of the targeting image, or a change in the color of the targeting image or a change on the apparent plane (deep, in-plane, or float).

In certain embodiments according to this disclosure, a method of securing an article of manufacture is provided. In some embodiments, a method comprises securing the micro-optic security device to an article of manufacture by coupling a face of the security device to a face of the article of manufacture. In a preferred embodiment, when the security device is coupled to the article of manufacture, the array of image icon elements is proximate the article of manufacture while the array of focusing elements are distal.

In another aspect of the present disclosure, a micro-optic security device produced by the disclosed method of producing the optical security device is provided. In one particular embodiment, the micro-optic security device comprises an image projection system having (i) an array of focusing elements; (ii) an array of image icon elements disposed proximate to the array of focusing elements such that at least one synthetic image is projected by the image projection system when at least portions of the array of image icon elements are viewed through at least portions of the array of focusing elements; and (iii) an array of control pattern elements integrated across the array of image icon elements; a set of targeting images at least one of which is one of the synthetic images projected by the image projection system; and at least one reward image. The micro-optic security device is further characterized in that it is produced by (i) providing an array of focusing elements; (ii) providing an array of image icon elements; and (iii) arranging the array of focusing elements and array of image icon elements, relative to each other, such that a synthetic image is projected by the image icon elements when at least portions of the array of image icon elements are viewed through at least portions of the array of focusing elements. It is further characterized in that the micro-optic security device provides at least two targeting images that are spatially coordinated at predetermined alignment phases such that the spatial coordination coincides with the revelation of at least one reward image. The method is also further characterized in that the spatial coordination of the targeting images coincide with when the in-phased portions of the array of control pattern elements are in focus of the array of focusing elements.

In yet a further aspect, a secured article of manufacture is provided. In some embodiments, the secured article of manufacture comprises (i) an article of manufacture, and (ii) at least one micro-optic security device. The secured article of manufacture is characterized in that the micro-optic security device is securely coupled to at least one face of the article of manufacture such that it is at least partially visible to an end-user. In a further embodiment, the secured article of manufacture is characterized in that the micro-optic security device is couple to the article of manufacture such that an end-user may visually engage the micro-optic security device. In a further embodiment, the micro-optic security device comprises (i) an array of focusing elements; (ii) an array of image icon elements; and (iii) a synthetic image projected by the image icon elements when at least portions of the array of image icon elements are viewed through at least portions of the array of focusing elements. The micro-optic security device is further characterized in that the security device provides a dynamic optical effect comprising at least one targeting effect. In a further embodiment, the micro-optic security device is further characterized in that the array of image icon elements includes an array of control pattern elements.

Other embodiments according to this disclosure include use of the micro-optic security device to authenticate an article of manufacture. Here the micro-optic security device is integrated with the article of manufacture such that it can be readily engaged by an end-user of the article of manufacture. Certain embodiments include a secured article of manufacture comprising at least one micro-optic security device as described herein. A method of integrating the micro-optic security device with an article of manufacture also forms an aspect of the present disclosure, wherein the method comprises providing an article of manufacture with a substrate surface and coupling the micro-optic security device to the substrate surface.

Embodiments will now be further described herein such that a person having ordinary skill in the art (hereinafter "PHOSITA") may be able to make and use the invention without having to resort to undue experimentation. As such, the embodiments heretofore or hereafter described herein are not intended to limit the scope of the claimed invention and shall be interpreted solely as exemplary embodiments provided for purposes of describing the claimed invention. It should be apparent to a PHOSITA that many more modifications and embodiments besides those explicitly described herein are possible. Moreover, in interpreting the disclosure, all terms should be interpreted in the broadest possible manner consistent with the context expressed herein. In particular, the terms "comprises", "having" and "comprising" should be interpreted as referring to elements, components, or steps in a non-exclusive manner, indicating that the referenced elements, components, or steps may be present, or utilized, or combined with other elements, components, or steps that are not expressly referenced or can be combined in particular with other embodiments described herein.

As used in this disclosure and in the appended claims, the singular forms "a", "an", and "the" include plural referents unless the context clearly dictates otherwise.

References herein to components such as targeting images, reward images, array of image icon elements, array of focusing elements, or array of control pattern elements shall be understood to include embodiments with all or only portions of those components, unless the context unambiguously requires a different interpretation.

All publications mentioned herein are incorporated herein by reference to disclose and describe the methods and/or materials in connection with which the publications are cited. The publications discussed herein are provided solely for their disclosure. Nothing herein is to be construed as an admission that the present invention is not entitled to antedate such publication by virtue of prior invention.

Definitions

The term "dynamic effect", as used herein, is interchangeable with "dynamic optical effect" and "interactive dynamic optical effect" and refers to a transformation of an image projected by a security device or an image projection system as the viewing angle of the security device or image projection system is changed.

The term "in-phased", as used herein, defines where, from at least one point of view, the control pattern overlaps with at least one pattern of image icon elements.

The term "natural image", as used herein, refers to an image not provided by the cooperation of focusing elements and the image icon elements or which does not require the focusing elements for both magnifying and composing the image. Examples of natural images include, without limitation, traditionally printed images such as offset, intaglio or screen printed images, watermarks, certain features in the substrate of a secure article, a window in the article's substrate, or areas of a secured article with no print or print of different colors.

The term "optical coordinate", as used herein, refers to a location observable within the micro-optic security device and in particular a location observable through the array of focusing elements. It functions as a targeting image and is observable through the array of focusing elements such that it may be coordinated with the prime synthetic image such that when they are spatially coordinated at a predetermined alignment phase, their spatial coordination will coincide with the revelation of a reward image (e.g., the reward image turns on as the prime synthetic image reaches a predetermined distance from the optical coordinate).

The term "optical image", as used herein, refers to an image provided by image projection system that is either not magnified or not composed by the array of focusing elements.

The term "out-phased", as used herein, defines where, from any point of view, the control pattern does not overlap with at least one pattern of image icon elements.

The term "static optical effect", as used herein, refers to a synthetic image which does not transform but rather remains the same across all viewing angles.

The term "alignment phase", as used herein, refers to the relative location of the focusing elements' focal points, as determined by the viewing angle of the observer, with respect to the icon image array. For a specific manufactured article, the alignment phase is associated with the angle at which an observer views the security device. In certain embodiments, the association between viewing angle and alignment phase is consistent (for example, the alignment phase occurs at the same or substantially the same viewing angle). In various embodiments, the association between viewing angle and alignment phase varies (for example, the alignment phase is associated with different viewing angles across devices).

BRIEF DESCRIPTION OF THE DRAWINGS

Particular features of the disclosed invention are illustrated by reference to the accompanying drawings in which:

FIGS. 1a through 1e illustrate cross-sectional views of a security device having the array of image icon elements printed onto an optical spacer (1a); having the array of image icon elements formed as a voids (which may be filled or coated) (1b); having the array of image icon elements formed as filled voids within the optical spacer (1c); having the array of image icon elements being viewed through an array of focusing elements which are pin holes in a separate layer (1d); having the focusing elements as a reflective system disposed beneath the array of image icon elements (1e); and having the array of image icon elements being viewed through an array of sealed focusing elements (1f).

DETAILED DESCRIPTION

Figure 2A:
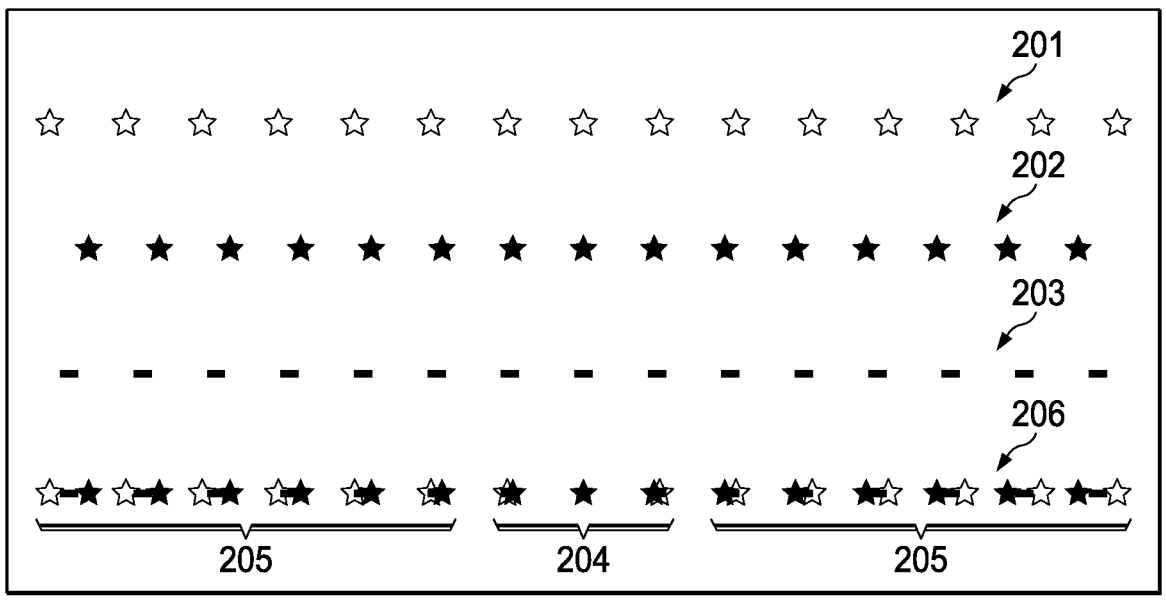
FIGS. 2a through 2d illustrate top-side views of the array of image icon elements integrated with the control pattern where two parallax images are coordinated to reveal a reward image at a predetermined alignment phase (2a); where the control pattern is a window through which the reward image is seen (2b); where the control pattern is used to eliminate one or more of the image elements (2c); and where the target image is a printed image (2d).

According to certain embodiments, by providing a micro-optic security device having a targeting effect, an end-user can modulate the transformation or interaction of targeting images to reveal at least one reward image, thereby increasing the likelihood of enticing an end-user to engage the security device. As such, an end-user of the security device can turn on or off the targeting images and/or the reward images by changing viewing angles to spatially coordinate the targeting images, by moving in and out of ranges of viewing angles associated with alignment phase(s). To turn on the targeting and/or reward images means to reveal those images or to make those images visible at certain viewing angles while to turn off the targeting and/or reward images means to make those images less visible, partially invisible or completely invisible at certain viewing angles. Through end-user modulation of these targeting effects, the security device is more interactive and is more engaging to the end-user and is therefore more likely to function as to secure the article of manufacture through authenticating or aestheticizing the articles of manufacture to which the security device is affixed.

The micro-optic security device, interchangeably referred to herein as the security device, comprises an image projection system and displays a set of targeting images and at least one reward image.

The image projection system, along with the set of targeting images and the reward image, comprises elements of the security device. This image projection system comprises an array of focusing elements that is coupled with an array of image icon elements (e.g., micro-image elements). These coupled arrays may be directly layered to each other or may be interspersed with other arrays or layer or may include multiple arrays of micro-images elements or multiple arrays of focusing elements. In various embodiments, the array of image elements is integrated with a pattern of control elements that modulates the revelation of the reward image, the targeting images or both. The image projection system either individually provides the set of targeting images or provides less than the full set of targeting images that is then combined with a natural image to provide the full set of targeting images. In any case, at least one of the targeting images will be provided by the image projection system. These image projection systems comprise at least one array of micro-images elements in the form of image icon elements and at least one array of focusing elements. Together the image icon elements and the focusing elements are disposed relative to each other such that they cooperate to provide at least one targeting image, which is a synthetic image projected from the array of image icon elements when at least portions of the image icon elements are viewed through at least portions of the focusing elements. Importantly, the image projection system includes an array of control pattern elements disposed across the array of image icon elements or a part thereof. The array of control pattern elements modulates the turning on and off of the targeting images and the reward image(s); particularly, the control pattern elements modulate the revelation of the reward image. In one embodiment, as best depicted in FIG. 1, the array of focusing elements (101) and the array of image icon elements (103) are layered proximate to each other. At one or more viewing angles, an observer who views the image icon elements observes a synthetic image that is projected by the security device through the cooperation of the image icon elements and the focusing elements. Various embodiments are contemplated as suitable for use as the image icon elements and as the focusing elements. Suitable image elements and focusing elements and methods of providing them are described in International Patent Application Publications WO2005/052650, WO2006/125224, WO2008/008635, WO2011/019912, WO2011/163298, WO/2013/028534, WO2014/143980, WO2009/017824, WO2016/044372, WO2016/011249, WO2013/163287, WO2007/133613, WO2012/103441, and WO2015/148878, WO2005/106601, WO2006/08713, which are all incorporated herein in their entirety. In preferred embodiments, the image elements are in the form of voids, solid regions, protrusions, or any combination thereof. Suitable focusing elements and methods of providing them are described in International Patent Application Publications WO2006/125224, WO2008/008635, WO2011/019912, WO/2013/028534, WO2014/143980, WO2016/044372, WO2016/011249, WO2007/133613, WO2012/103441, WO2015/148878, WO2017/105504, WO2005/106601, WO2006/087138, which are all incorporated herein in their entirety.

Moreover, it is also contemplated herein that other components may be added to the array of image icon elements, the array of focusing elements, or added in between the array of image icon elements or array of focusing elements. Examples of suitable additional components include, without limitation, an optical spacer, a coating layer, a tie layer, a master-relief lacquer layer, a patterned metallic layer, a reflective layer, an opacifying layer, a vapor-deposited layer, a colorshifting construction layer, an anti-soiling layer, a stiffening layer or a pigmented or dyed layer. It is also contemplated that multiple arrays of micro-image elements or image icon elements are also integrated as part of the image projection system. Similarly, it is also contemplated that multiple arrays of focusing elements are also integrated as part of the image projection system. It is also contemplated that the focusing elements are sealed lenses being either partially or fully sealed. For example, in certain embodiments, the sealing layer occupies interstitial spaces between the individual focusing elements, while in other embodiments the sealing layer covers the full height of the individual focusing elements and can be shaped in the form of the focusing elements or may be flat on the side distal from the focusing elements. In other embodiments, the sealing layer covers the entire image projection system, including the focusing elements and the array of micro-image elements.

It is also contemplated herein that the array of image icon elements and the array of focusing elements may be ordered in various sequences. For example, in one embodiment the array of image icon elements are layered beneath the array of focusing elements such that an observer viewing the security device from the first side would view the image icon elements through the focusing elements. In another embodiment, the array of image icon elements are layered above the array of focusing elements such that an observer viewing the security device from the first side would see the image icon elements without viewing them through focusing elements. It is also contemplated herein that the image elements are viewed through a separate array of pin holes that function as focusing elements.

Various focusing elements and image icon elements are contemplated within the scope of the present invention; many of which, in light of the instant disclosure, will become apparent to a PHOSITA. Preferred embodiments are depicted by FIGS. 1a-1e. Alternatives are further described in International patent application publication WO 2013/028534 which describes a transferrable micro-optic system wherein the image icon elements are substantially embedded within the focusing elements; WO 2005/052650 describes a micro-optic security device describing various image icon elements, focusing elements organized and arranged in various sequences to provide a synthetic image; WO 2013/163287 and WO 2014/039476 also describe a suitable micro-optic security device where the image icon elements are different view-points of an image are interlaced where the different view-points are interlaced and pixel mapped to form the image icon elements; WO 2009/017824 describes image icon elements that are a combination of multiple image elements that are stitched together to form a single image icon element; WO 2011/163298 describes focusing elements that are embedded; all of which are herein incorporated by reference in their entirety.

Suitable focusing elements may take various forms and include all elements that are capable of being organized into an array where they can be used to both magnify and consolidate or combine image icon elements or portions thereof into a composite and magnified image (i.e., a synthetic image). For example, suitable focusing elements include, without limitation lenses such as lenticular lenses, whether parallel or cross-hatched, or non-cylindrical or microlenses. The shape, size and any pigment may be chosen to satisfy a desired purpose. These lenses may be reflective or refractive. Moreover the refractive index, f #, diameter and shape may each be adjusted to obtain a desired optical effect when in cooperation with the image icon elements. The present invention also contemplates that the focusing elements are grin lenses having a gradient refractive index. For example FIG. 1a provides printed image icon elements (103) disposed in an array on one side of an optical spacer (102) and opposite an array of focusing elements (101). FIG. 1b by contrast, provides the image icon elements (103) as micro-image elements (103) that are formed on/in the optical spacer (102) which may optionally be filled (full or partial) or coated (flood, pattern). In an alternative embodiment, the image icon elements may be formed in the optical spacer (102), filled (103) and covered or may be applied as a separate layer as shown in FIG. 1c. The focusing elements themselves may be refractive, reflective, or a combination thereof. Or, as depicted in FIG. 1d, the focusing elements (104) may be pin holes through which the image icon elements may be viewed to project the synthetic image. FIG. 1e provides the focusing elements as an array of reflective lenses (101) disposed beneath an array of image icon elements (103) such that an observer positioned proximate the image icon elements (103) can view the array of image elements as a projected synthetic image through the reflection of the array of reflective focusing elements (101).

In certain embodiments, the focusing elements described in the various embodiments herein are micro-lenses. In various embodiments according to this disclosure, the micro-lenses are aspherical or spherical with a polygonal base and are arranged in multiple domains of hexagonal arrangements. In certain embodiments, the microlenses are arranged in rectangular, triangular and other geometrically repeating arrangements. In various embodiments, the microlenses have polygonal, circular or elliptical bases. In some embodiments, the microlenses have polygonal bases with rounded vertices. Applicants have found that embodiments utilizing a hexagonal arrangement can effectively increase the resolution of synthetic images formed by the focusing elements and the micro-image elements. The focusing elements contemplated as being within the scope of the present disclosure may be convex or concave.

The micro-optical security devices, as described herein, include an image presentation system having an array of image icon elements and an array of focusing elements. The image icons and the focusing elements cooperate to produce a synthetic image when the image icon elements are viewed through the array of focusing elements.

Image icon elements are organized in an array that is integrated with an image icon layer. These image icon elements may be in the form of an image or they may be portions of an image. Through the cooperation with the array of focusing elements, these icon elements are magnified and are composed to form a composite image as the individual focusing elements focus on the images or the portions of images. In some embodiments, the image icon elements form images through relief structures that are integrated with the image icon layer. As such, integration as used in this context includes applying a relief structure into the image icon layer—by embossing for example—or it involves applying a relief structure onto the image icon layer—such as by printing or by applying a coating layer to the image icon layer and embossing that coating layer with a relief structure representative of the image or image portions.

The relief structures forming the image icon elements may be of various sizes including micro-sized, nano-sized, macro-sized or any combination thereof. While it is contemplated that nano-sized or macro-sized would be suitable, in some embodiments, the micro-sized image icon elements are also effective. The inventors have found that such preferred embodiments of the image icon elements have improved manufacturability over the alternatives.

The relief structures that form the image icon elements may be in the form of recesses, posts or a combination thereof. Where such relief structures are recesses, they may be shallow recesses that terminate somewhere within the thickness of the image icon layer or they may be voids that pass through the image icon layer and abuts one other layer.

The image icon elements can be formed by various methods including, for example, laser patterning, photolithography, machining, embossing, printing, injection, other molding techniques, or any combination thereof.

The voids may be coated by various methods including, for example, electroplating, electroless plating, vapor deposition (e.g., chemical and/or physical), monomer vapor deposition, sputtering, spin coating, roll coating, other coating methods and any combination thereof.

In certain embodiments according to this disclosure, image icon elements cooperate with the array of focusing elements to provide a synthetic image.

Figure 3:
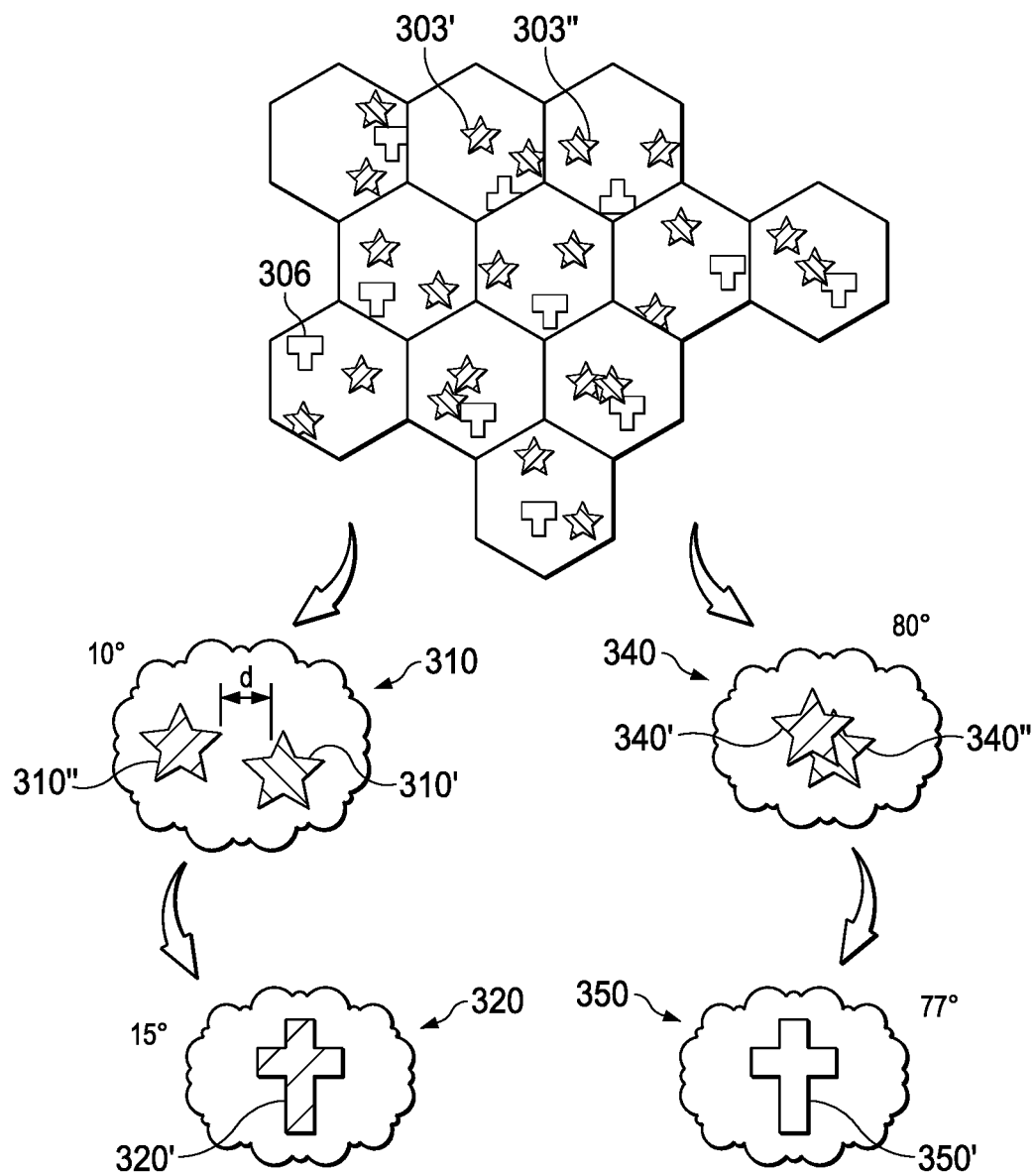
FIG. 3 provides views of an array of image icon elements and the corresponding targeting effect.

The control pattern elements are integrated with the array of image icon elements such that at an in-phased arrangement, targeting images are turned off and a reward image is turned on. The control pattern may be in the form of any shape or size as desired and arranged such that at a predetermined alignment phase, the device allows an observer to see a target image, while another set of predetermined alignment phases, the device allows an observer to see a set of reward images. This is illustrated by FIG. 3 where the synthetic images (310), which are targeting images, are observed at a 10 degree rotation point of view, and are separated by a separation distance d. In this illustrative example, a separation distance of less than d will allow the observer to see the reward images. As the security device is oriented to a 15 degree rotation point of view, the targeting images approach a separation distance of less than d, which causes reward image (320) to be turned on (revealed) while the targeting images (310', 310") are turned off. A similar effect is observed when the targeting images (340', 340") begin to overlap at 80 degree rotation point of view, such that at a 77 degree rotation point of view, they are sufficiently overlapped for this particular design to produce a reward image, and a reward image (350') is turned on and the targeting images (340', 340") are turned off.

The control pattern, as illustrated in FIGS. 2a through 2d, may exist in-phase and/or out-of-phase, depending on the design of the pattern of image icon elements in the array of image icon elements. In the illustrative example of FIG. 2a, icon images 1 (201) and icon images 2 (202) are components of the array of image icon elements. In this explanatory example, the components are superimposed upon one another. This particular superposition has areas where 201 and 202 are aligned in-phase, or otherwise overlap (204). In certain embodiments, the degree to which the overlap is considered to be in-phase is a design choice. An array of control pattern elements (203) can then be additionally added to the array of icon elements and superimposed such that it is also in-phase with the two previous components (206). According to certain embodiments, this ensures that the control pattern, which modulates the appearance of the reward image, is in-phase with the image icon elements, such that, when the image icon elements are sufficiently close together, the control pattern will reveal the reward image at a specific location. In the illustrative example of FIG. 2a, a reward image is created when "Icon Images 1" (201) which provide parallax image 1 and "Icon Images 2" (202) are, for a portion of their lengths, in phase with each other, and also in phase with the "windows" of control pattern (203). Further, as shown in this illustrative example, in area (205), when icon images (201) and (202) are out of phase with each other, no reward image is visible. Similarly, in area (204), icon images (201) and (202) are in phase with each other, and the elements of control pattern (203), revealing a reward image. Moreover, the control pattern may be integrated as part of the array of image icon elements thereby functioning to turn on the reward image. As such the control pattern may itself by an array of voids filled or coated (FIG. 2c) with a contrasting material, or may be a window (FIG. 2b) through which the image icon elements used to project a set of reward images are viewed.

Figure 2B:
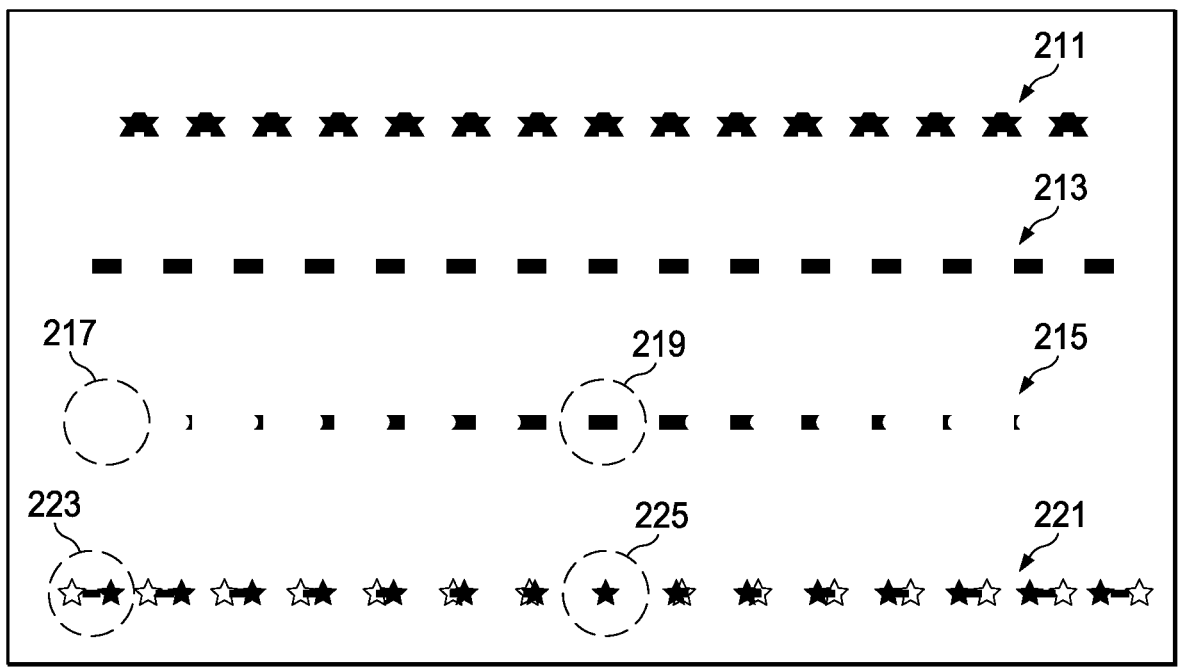

FIG. 2b illustrates an embodiment in which the reward image is composed as a parallax image (213), which is visible at a predetermined alignment phase through the "windows" of control pattern (213). The interplay between control pattern (213) and elements of icon layer (225) is illustrated in line (215). In certain areas, for example, in area (217), elements of control pattern (213) create blank spaces on the icon layer, wherein the icon is not visible through the control pattern. Similarly, in certain areas, for example, in area (219), control pattern (213) allows for high visibility of the icon layer, such as by allowing a significant amount of one or more ink filled recesses to be visible. As shown in the non-limiting example of FIG. 2b, icon layer (221) comprises two or more sets of icon images which can variously be in-phase with each other and elements of the control pattern (for example, as shown in area (225)), or out of phase with each other and the elements of the control pattern (for example, as shown in area (223)).

Figure 2C:
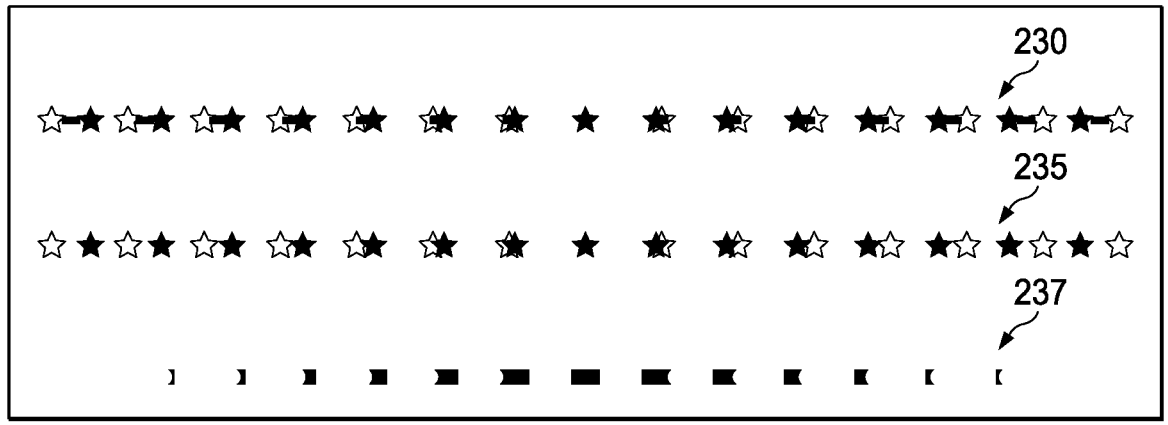

FIG. 2c further illustrates the operation of a control pattern (237) according to certain embodiments. In various embodiments according to this disclosure, control pattern (237) is not an ink-filled recess, but rather a pattern of elements which eliminates one or more other patterns (for example, icon layer pattern (235)), causing reward image information to be visible through the "windows" or "holes" of control pattern (237). In the illustrative example of FIG. 2c, this elimination is illustrated in row (230).

Figure 2D:
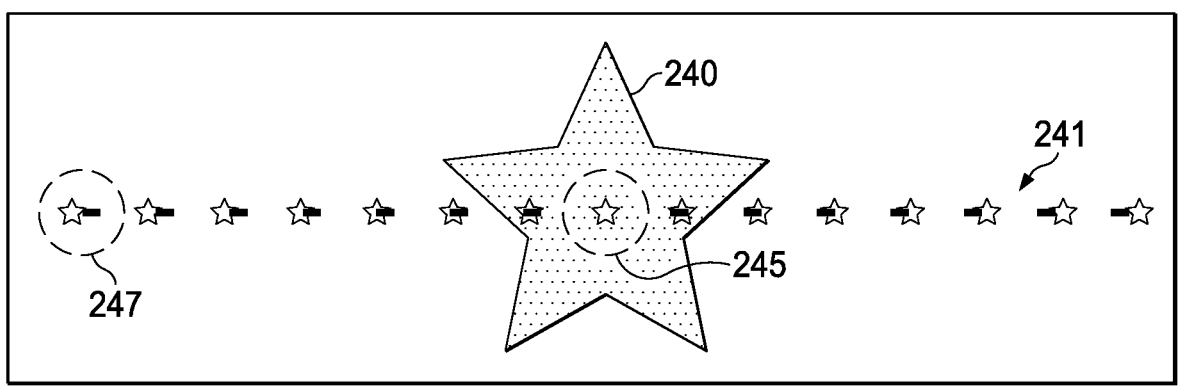

In one illustrative embodiment, as shown in FIG. 2d, a printed element (240), such as a star, acts as a target image, such that when another targeting image, provided by the image projection system, aligns with the printed star, as shown in area (245), control pattern (241) and projected synthetic image are in phase, thereby triggering the revelation of the reward image. Similarly, when control pattern (241) and projected synthetic image are out of phase (for example, as shown in area (247)), the reward image is not visible.

As used in this disclosure, the term "synthetic image" encompasses an image that is synthetically magnified by the array of focusing elements in two ways. As such, the focusing elements, when used to view the array of image icon elements, increases the apparent size of the microimages or portions thereof depicted by the relief structures of the image icon elements. Additionally, when the array of image icon elements is viewed through the array of focusing elements, the portions of the array of image icon elements that are in focus at any given viewing angle, are optically combined to form at least one synthetic image.

The size of the synthetically magnified image can, in various embodiments, be modulated by the coordination or selection of a number of factors. For example, as described herein, each of the array of image icon elements and the array of focusing elements can be individually arranged such that a repeat pattern of image icon elements or sets of image icon elements, or a repeat pattern of focusing elements or sets of focusing elements, repeat along a selected angle. This selected angle is referred to herein as the skew axis and this skew axis will traverse a particular angle referred to herein as the skew angle. The magnitude of the synthetic magnification can be increased or decreased depending on the degree of skew between the skew axis of the array of focusing elements and the skew axis of the array of image icon elements. For example, where each of the array of focusing elements and array of image icon elements have an identical pattern, misaligning their skew axis slightly such that the skew angle of the array of focusing elements is slightly larger or smaller than that of the array of image icons can produce a set of synthetic images that are magnified versions of the image icon elements, but have been rotated by approximately plus or minus 90 degrees relative to the image icons.

At least one of the targeting images according to some embodiments of this disclosure is a synthetic image projected by the image projection system; more specifically this synthetic image is projected by the image icon elements when at least portions of the image icon elements are viewed through at least portions of the array of focusing elements. Accordingly, the image projection system comprises at least one array of focusing elements; at least one array of image icon elements; and at least one array of control pattern elements.

According to various embodiments, the targeting images of the security device include at least one synthetic image projected by the image projection system. For simplicity, this targeting image will be referred to as the prime synthetic image. In a preferred embodiment, this targeting image provides a dynamic optical effect—also referred to herein as a dynamic effect—whereby this targeting image appears to change location, change color, change size, or change shape as the viewing angle changes. The other targeting images can be selected from an optical coordinate, an optical image, a natural image, or another synthetic image.

The targeting images are coordinated such that at a predetermined alignment phase, their appearance is modulated. For instance, in one embodiment, when the distance between the targeting images is shortened by changing viewing angles such that they are very close or they are overlapping at one or more predetermined alignment phases, at least one of the targeting images disappears; preferably the entire set. Alternatively, where the color or shape of one of the targeting images is changed by changing viewing angles such that a color/shape match is observed at a predetermined alignment phase, at least one of the targeting images disappears. In certain embodiments, the entire set of targeting images disappears. In various embodiments enough of the set of targeting images disappears such that the reward image is not obscured by the aligned targeting images. Where the size between targeting images is adjusted up or down by changing viewing angles such that a predetermined size is observed at a predetermined alignment phase, at least one of the targeting images disappears; preferably the entire set.

Targeting images may take any shape, size, color or combination thereof. Images, as used in this context include text, numbers, symbols, portraits or any combination thereof.

The targeting images are, in certain embodiments, coordinated to have a spatial interaction which coincides with the revelation of a reward image.

Reward images, as used herein, may also take any shape, size, color or combination thereof. Moreover, the reward images are revealed when the targeting images spatially interact as described above. In various embodiments, the entire reward image remains hidden at all viewing angles except the predetermined alignment phase(s). In certain embodiments, only a portion of the reward image is hidden, such that at the predetermined alignment phase only complementary portions of the reward image is revealed.

The reward image as used in the context of the present disclosure includes synthetic images, such as a prime synthetic image, or an optical image, or a natural image, such as a printed image. In some embodiments, a reward image which is also a prime synthetic image can be effective as a reward image since such images also provide a dynamic effect which further engages the observer. In certain embodiments, the reward image may be a static image that remains hidden until the targeting images interact in the predetermined manner such as by spatial interaction, shape interaction, color interaction, size interaction or any combination thereof.

A micro-optic security device according to a first set of embodiments includes an image projection system comprising: (i) an array of focusing elements (101), (ii) an array of image icon elements (103) disposed proximate to the array of focusing elements such that at least one synthetic image is projected by the image projection system when at least portions of the array of image icon elements are viewed through at least portions of the array of focusing elements, and (iii) an array of control pattern elements (203) integrated across the array of image icon elements. The micro-optic security device further includes a set of targeting images (310', 310"), comprising at least one targeting image which is one of the at least one synthetic images projected by the image projection system, and at least one reward image (350), wherein the security device provides a targeting effect whereby at a predetermined alignment phase the targeting images are spatially coordinated to coincide with revelation of the reward image.

In some embodiments within the first set of embodiments, the array of control pattern elements include in-phased portions and out-phased portions, wherein when the array of focusing elements focus on the in-phased portions, substantially all portions of the array of control pattern elements are in focus.

In some embodiments within the first set of embodiments, the array of control pattern elements eliminate portions of the array of image icon elements.

In some embodiments within the first set of embodiments, the control pattern elements comprise windows through which the reward image becomes evident when the micro-optic security device is viewed in the predetermined alignment phase.

In some embodiments within the first set of embodiments, at least two of the targeting images are synthetic images projected by the image projection system and at least one of the reward images is a synthetic image projected by the image projection system.

In some embodiments within the first set of embodiments, at least one of the targeting images comprises an optical image and at least one of the reward images is at least one of a synthetic image or an optical image.

In some embodiments within the first set of embodiments, in the predetermined alignment phase, the targeting images are completely hidden and outside of the predetermined alignment phase, the reward image is completely hidden, wherein the reward image is revealed only when the array of focusing elements are focused on an in-phased portion of the array of control pattern elements.

In some embodiments within the first set of embodiments, at least one of the targeting images has a dynamic effect and at least one of the reward images has a dynamic effect.

In some embodiments within the first set of embodiments, the spatial coordination between the targeting images is based on at least one of: a predetermined location of the targeting images, a predetermined color change of the targeting image, or a predetermined size change of the targeting images.

In some embodiments within the first set of embodiments, at least one of the targeting images comprises an optical image printed on an article of manufacture.

In some embodiments within the first set of embodiments, focusing elements of the array of focusing elements are non-cylindrical; image icon elements of the array of image icon elements are recesses filled with a pigmented ink, control pattern elements of the array of control pattern elements are arranged in an array of eliminated portions of the image icon elements, the set of targeting images comprises a set of two synthetic images with dynamic effects, the set of two synthetic images spatially coordinated such that when the targeting images overlap in the predetermined alignment phase, and at least one reward image is revealed and the targeting images are hidden.

In some embodiments within the first set of embodiments, focusing elements of the array of focusing elements are non-cylindrical, image icon elements of the array of image icon elements are recesses filled with a pigmented ink, control pattern elements of the array of control pattern elements are arranged in an array of eliminated portions of the image icon elements, the set of targeting images comprises a set of one synthetic image and one optical image printed on an article of manufacture, the set of one synthetic image and one optical image spatially coordinated such that when the targeting images overlap at the predetermined alignment phase, and the reward image is revealed and the targeting images are hidden.

In some embodiments within the first set of embodiments, focusing elements of the array of focusing elements are embedded in an optical film.

In some embodiments within the first set of embodiments, an optical spacer is disposed between the array of focusing elements and the array of image icon elements.

In some embodiments within the first set of embodiments, image icon elements of the array of image icon elements comprise at least one of microstructured voids, posts or a combination thereof integrated into a microstructured layer.

In some embodiments within the first set of embodiments, a contrasting material is disposed in or on at least part of the microstructured voids, the posts, or a combination thereof.

In some embodiments within the first set of embodiments, the array of focusing elements are selected from a group which includes lenticular lenses, cross-hatched lenticular lenses, non-cylindrical lenses, micro-mirrors or any combination thereof.

In some embodiments within the first set of embodiments, focusing elements of the array of focusing elements comprise at least one of non-cylindrical spherical or aspherical lenses arranged in a hexagonal pattern.

In some embodiments within the first set of embodiments, focusing elements of the array of focusing elements comprise focusing elements with an f # of less than 3 and a diameter of less than 50 μm.

In some embodiments within the first set of embodiments, at least one of the targeting image or reward image is a floating image, deep image, or an image that can transition from a floating image to a deep image.

A method of producing a micro-optic security device of the first set of embodiments, comprising: providing an image projection system having an array of image icon elements integrated with an array of control pattern elements and layered with an array of focusing elements such that at least one synthetic image is projected by the image projection system when at least portions of the array of image icon elements is viewed through at least portions of the array of focusing elements. The so-produced micro-optic security device provides at least two targeting images that are spatially coordinated such that at a predetermined alignment phase in-phased portions of the array of control pattern elements are in focus and at least one reward image is revealed.

Use of a micro-optic security device according to the first set of embodiments for authenticating an article of manufacture, wherein the micro-optic security device is integrated with the article of manufacture such that it can readily be engaged with by an end user of the article of manufacture.

A secured article of manufacture comprising at least one micro-optic security device of the first set of embodiments.

A method of integrating the micro-optic security device of the first set of embodiments with an article of manufacture.

What is claimed is:

1. A micro-optic security device comprising:
    an image projection system comprising:
        an array of focusing elements;
        an array of image icon elements disposed proximate to the array of focusing elements such that at least one synthetic image is projected by the image projection system when at least portions of the array of image icon elements are viewed through at least portions of the array of focusing elements,
    wherein the array of image icon elements comprises a first set of image icons, which when viewed through the array of focusing elements, project one or more targeting images of a first set of targeting images wherein the one or more targeting images of the first set of targeting images comprise a synthetically magnified image,
    wherein the array of image icon elements comprises a second set of image icons, which when viewed through the array of focusing elements at a predetermined viewing angle providing an alignment phase, provide one or more reward images, wherein the one or more reward images comprise a static image; and
    an array of control pattern elements integrated across the array of image icon elements, wherein the array of control pattern elements comprises a control pattern of windows or holes disposed at a location within the micro-optic security device alignable with focal points of focusing elements of the array of focusing elements, through which the second set of image icons are visible through the array of focusing elements at the predetermined viewing angle providing the alignment phase,
    wherein the micro-optic security device provides a targeting effect, whereby, at the predetermined viewing angle providing the alignment phase, the one or more reward images are revealed.

2. The micro-optic security device of claim 1, wherein the array of control pattern elements include in-phased portions and out-phased portions,
    wherein the in-phased portions and out-phased portions are phased relative to the array of focusing elements such that when the micro-optic security device is viewed from a viewing angle relative to a plane of a surface of the micro-optic security device where the in-phased portions of the array of control pattern elements align with the second set of image icons, focal points of focusing elements of the array of focusing elements cover substantially all portions of the array of control pattern elements, and control pattern elements of the array of control pattern elements overlap with image icons of the second set of image icons.

3. The micro-optic security device of claim 1, wherein control pattern elements of the array of control pattern elements occlude portions of the array of image icon elements.

4. The micro-optic security device of claim 1, wherein control pattern elements of the array of control pattern elements comprise windows through which the one or more reward images become visible when the micro-optic security device is viewed at the predetermined viewing angle providing the alignment phase.

5. The micro-optic security device of claim 1, wherein the array of image icon elements comprises a third set of image icons, which, in conjunction with the first set of image icons, project a second set of targeting images when viewed through the array of focusing elements, wherein the second set targeting images comprise synthetic images projected by the image projection system.

6. The micro-optic security device of claim 1, wherein the one or more targeting images of the first set of targeting images further comprises a static image.

7. The micro-optic security device of claim 1, wherein, in the alignment phase, the one or more reward images are revealed only when the array of focusing elements are focused on the array of control pattern elements.

8. The micro-optic security device of claim 1, wherein at least one targeting image of a set of targeting images has a dynamic effect and the one or more reward images have a dynamic effect.

9. The micro-optic security device of claim 1, wherein a spatial coordination between the one or more targeting images of the first set of targeting images is based on at least one of: a predetermined location of the one or more targeting images, a predetermined color change of the one or more targeting images, or a predetermined size change of the one or more targeting images.

10. The micro-optic security device of claim 1, wherein focusing elements of the array of focusing elements are non-cylindrical, image icon elements of the array of image icon elements are recesses filled with a pigmented ink, control pattern elements of the array of control pattern elements are arranged in an array of eliminated portions of the image icon elements, the one or more targeting images of the first set of targeting images comprise a synthetic image and a static image printed on an article of manufacture such that the synthetic image and the static image spatially coordinated such that when the one or more targeting images of the first set of targeting images overlap at the predetermined angle providing the alignment phase, the one or more reward images are revealed and the one or more targeting images of the first set of targeting images are hidden.

11. The micro-optic security device of claim 1, wherein focusing elements of the array of focusing elements are embedded in an optical film.

12. The micro-optic security device of claim 1, wherein an optical spacer is disposed between the array of focusing elements and the array of image icon elements.

13. The micro-optic security device of claim 1, wherein image icon elements of the array of image icon elements comprise at least one of microstructured voids, posts or a combination thereof integrated into a microstructured layer.

14. The micro-optic security device of claim 13, wherein a contrasting material is disposed in or on at least part of the microstructured voids, the posts, or a combination thereof.

15. The micro-optic security device of claim 1, wherein the array of focusing elements are selected from a group which includes lenticular lenses, cross-hatched lenticular lenses, non-cylindrical lenses, micro-minors or any combination thereof.

16. The micro-optic security device of claim 1, wherein focusing elements of the array of focusing elements comprise at least one of non-cylindrical spherical or aspherical lenses arranged in a hexagonal pattern.

17. The micro-optic security device of claim 1, wherein focusing elements of the array of focusing elements comprise focusing elements with an f # of less than 3 and a diameter of less than 50 µm.

18. The micro-optic security device of claim 1, wherein at least one of the one or more targeting images of the first set of targeting images or the one or more reward images is a floating image, a sunken image, or an image that can transition from a floating image to a sunken image.

* * * * *